(12) United States Patent
Golas et al.

(10) Patent No.: US 10,643,339 B2
(45) Date of Patent: May 5, 2020

(54) MOTION BASED ADAPTIVE RENDERING

(71) Applicant: Samsung Electronics Co., Ltd., Suwon-si, Gyeonggi-do (KR)

(72) Inventors: Abhinav Golas, Mountain View, CA (US); Karthik Ramani, San Jose, CA (US); Christopher T. Cheng, Santa Clara, CA (US); John W. Brothers, Calistoga, CA (US); Liangjun Zhang, San Jose, CA (US); Santosh Abraham, Pleasanton, CA (US); Ki Fung Chow, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/913,776

(22) Filed: Mar. 6, 2018

(65) Prior Publication Data
US 2018/0197304 A1 Jul. 12, 2018

Related U.S. Application Data

(63) Continuation of application No. 14/743,700, filed on Jun. 18, 2015, now Pat. No. 9,928,610.

(60) Provisional application No. 62/018,221, filed on Jun. 27, 2014, provisional application No. 62/018,228, filed on Jun. 27, 2014, provisional application No.
(Continued)

(51) Int. Cl.
*G06T 7/33* (2017.01)
*G06T 7/32* (2017.01)
*G06T 7/30* (2017.01)
*G06T 1/60* (2006.01)
*G06T 5/00* (2006.01)
*G06T 11/00* (2006.01)
*G06T 15/00* (2011.01)
*G06K 9/62* (2006.01)
(Continued)

(52) U.S. Cl.
CPC ............ *G06T 7/337* (2017.01); *G06K 9/6202* (2013.01); *G06T 1/60* (2013.01); *G06T 5/001* (2013.01); *G06T 7/30* (2017.01); *G06T 7/32* (2017.01); *G06T 11/001* (2013.01); *G06T 15/005* (2013.01); *G06T 2200/12* (2013.01); *G06T 2207/10016* (2013.01); *G06T 2207/10028* (2013.01); *G06T 2207/20192* (2013.01); *G09G 5/363* (2013.01)

(58) Field of Classification Search
USPC ....................................................... 345/428
See application file for complete search history.

(56) References Cited

U.S. PATENT DOCUMENTS 6,664,959 B2  12/2003  Duluk, Jr. et al.
7,755,624 B1   7/2010  Hakura et al.
(Continued)

*Primary Examiner* — Wesner Sajous
(74) *Attorney, Agent, or Firm* — Lewis Roca Rothgerber Christie LLP

(57) ABSTRACT

An apparatus, system and method is provided to determine a motion of pixels in local regions of a scene, classify the motion into a speed category, and make decisions on how to render blocks of pixels. In one implementation the motion in a tile is classified into at least three different speed regimes. If the pixels in a tile are in a quasi-static speed regime, a determination is made whether or not to reuse a fraction of pixels from the previous frame. If the pixels are determined to be in a high speed regime, a decision is made whether or not a sampling rate may be reduced.

17 Claims, 19 Drawing Sheets

Related U.S. Application Data

62/018,254, filed on Jun. 27, 2014, provisional application No. 62/018,274, filed on Jun. 27, 2014.

(51) Int. Cl.
  *G09G 5/30* (2006.01)
  *G09G 5/36* (2006.01)

(56) References Cited

U.S. PATENT DOCUMENTS

| | | |
|---|---|---|
| 9,875,552 B1 | 1/2018 | Savage et al. |
| 2003/0218614 A1* | 11/2003 | Lavelle .................. G06T 15/005 |
| | | 345/539 |
| 2003/0227552 A1 | 12/2003 | Watanabe |
| 2005/0100319 A1 | 5/2005 | Saed |
| 2005/0259740 A1 | 11/2005 | Kobayashi et al. |
| 2007/0035707 A1* | 2/2007 | Margulis ................. G03B 21/26 |
| | | 353/122 |
| 2007/0296824 A1 | 12/2007 | Paine et al. |
| 2008/0044088 A1* | 2/2008 | Nakai .................... G06T 1/0007 |
| | | 382/232 |
| 2009/0252411 A1 | 10/2009 | Siddiqui et al. |
| 2011/0141136 A1 | 6/2011 | Cardno et al. |
| 2012/0154411 A1* | 6/2012 | Cheng ....................... G06T 1/20 |
| | | 345/506 |
| 2012/0200559 A1* | 8/2012 | Ahn ........................ G06T 15/00 |
| | | 345/419 |
| 2012/0253061 A1* | 10/2012 | Takahashi .............. G02B 27/26 |
| | | 560/158 |
| 2012/0257011 A1* | 10/2012 | Mengwasser ........ H04N 13/161 |
| | | 348/43 |
| 2012/0327077 A1* | 12/2012 | Tung .................... H04N 13/128 |
| | | 345/419 |
| 2014/0028669 A1* | 1/2014 | Tsukagoshi ............ A61B 6/022 |
| | | 345/419 |
| 2014/0125650 A1* | 5/2014 | Neill .................... H04N 13/111 |
| | | 345/419 |
| 2014/0184623 A1 | 7/2014 | Frascati et al. |
| 2015/0379674 A1* | 12/2015 | Golas ....................... G06T 1/60 |
| | | 345/426 |
| 2015/0379692 A1* | 12/2015 | Golas ....................... G06T 1/60 |
| | | 345/618 |
| 2015/0379727 A1* | 12/2015 | Golas ....................... G06T 1/60 |
| | | 382/103 |
| 2015/0379734 A1* | 12/2015 | Golas ....................... G06T 1/60 |
| | | 345/597 |
| 2016/0088287 A1* | 3/2016 | Sadi .................... H04N 13/254 |
| | | 348/43 |
| 2016/0163087 A1 | 6/2016 | Cho et al. |
| 2016/0307297 A1 | 10/2016 | Akenine-Moller et al. |
| 2017/0178397 A1 | 6/2017 | Hillesland |
| 2018/0310016 A1 | 10/2018 | Kopietz |

* cited by examiner

Use different sampling pattern every frame

Frame 0  Frame 1  Frame 2  Frame 3

4 Samples

8 Samples

16 Samples

*X and O indicate pixels part of a quad of 4 pixels

FIG. 6A

Advect: copy pixel data from x(n-1) to x(n)

Advect          Render

Example Sampling Pattern For Interpolation. X Marks Rendered Samples And O Is An Example Of An Interpolation Location

| X |   | X |   |
|---|---|---|---|
|   |   |   |   |
| X | O | X |   |
|   |   |   |   |

*FIG. 9*

Example Sampling Pattern For Interpolation In Which 8 samples are rendered. X Marks Rendered Samples in first group of four pixels And O Marks second group of rendered four pixels

| X |   | X |   |
|---|---|---|---|
|   | O |   | O |
| X |   | X |   |
|   | O |   | O |

FIG. 10

Advection vs. Spline Reconstruction

Velocity=0 →Advect       Velocity=+0.5 X →Reconstruct

MOTION BASED ADAPTIVE RENDERING

CROSS REFERENCE TO RELATED APPLICATIONS

This application is a continuation of U.S. patent application Ser. No. 14/743,700, filed Jun. 18, 2015, which claims priority to and the benefit of U.S. Provisional Patent Application No. 62/018,221, filed Jun. 27, 2014, U.S. Provisional Patent Application No. 62/018,228, filed Jun. 27, 2014, U.S. Provisional Patent Application No. 62/018,254 filed Jun. 27, 2014, and U.S. Provisional Patent Application No. 62/018,274, filed Jun. 27, 2014, the entire contents of all of which are incorporated herein by reference.

FIELD OF THE INVENTION

An embodiment of the present invention is generally related to techniques of performing graphics processing in which the number of samples rendered in a block of pixels is reduced. More particularly, an embodiment of the present invention is directed to automatically analyzing motion and other factors in individual display screen tiles (block of pixels) and making sampling decisions on a tile-by-tile basis.

BACKGROUND OF THE INVENTION

FIG. 1 illustrates major portions of a graphics pipeline 100 based on the OpenGL® 3.0 standard. An illustrative set of stages includes a vertex shader operations stage 105, a primitive assembly and rasterization stage 110, a fragment pixel shader operations stage 115, a frame buffer stage 120, and a texture memory 125. The pipeline operates to receive vertex data, shade vertices, assemble and rasterize primitives, and perform shading operations on fragments/pixels.

One aspect of the graphics pipeline 100 is that every region of an image is rendered at the same minimum resolution. In particular, in a conventional graphics pipeline, a sampling rate (average number of samples per pixel) is typically at least one sample for every pixel of an image.

One aspect of the conventional graphics pipeline is that it is wasteful and requires more pixel shading operations than desired. In particular, there is no automation in the graphics pipeline to permit strategic choices to be automatically made to reduce a sampling rate below one sample per pixel (sub-sampling/de-sampling) in local regions of an image. In the context of mobile devices, this means that the amount of energy that is consumed is higher than desired.

SUMMARY OF THE INVENTION

A graphics system adaptively renders individual portions of a frame based on the motion of the underlying objects being rendered with respect to the camera's frame of reference. In one embodiment, the adaptive rendering is based at least in part on the speed of objects rendered on the screen across at least two frames. Measuring motion in screen space (via pixels) incorporates the different source of motion, including object motion and camera motion. If the speed of the underlying motion is below a quasi-static limit, a decision may be made whether or not to reuse a fraction of pixels from the previous frame. In an intermediate speed regime a full sampling rate is used. In at least one higher speed regime, a decision is made whether to select a reduced sampling rate. The decisions may be made on a tile-by-tile basis, where a tile is a contiguous set of pixels in an image, typically in a block having a square or rectangular shape.

One embodiment of a method includes determining, on a tile-by-tile basis, a speed of pixels of objects in a current frame relative to a previous frame. Each tile is classified into one of at least three speed categories, the at least three categories including a quasi-static speed category, a medium speed category, and a high-speed category. A sampling decision is made for each tile, based at least in part on the speed category associated with each tile. The sampling decision includes deciding whether the tile is to be sampled at a full resolution sampling rate of at least one sample per pixel in the current frame or sampled at a lower rate in the current frame. The tiles are then rendered. In one embodiment, the sampling decision is further based on whether or not a tile is detected to have a strong likelihood of including an edge in color or depth. In one embodiment, for a tile classified in the quasi-static speed category the method further includes reusing pixel data from a previous frame by copying pixel data for the at least one pixel of the previous frame to the tile. In one embodiment, for a tile classified in the intermediate speed regime, every pixel is sampled at least once. In one embodiment, for a tile classified in the at least one high speed regime a selection is made of a sampling pattern in which a number of samples is less than the number of pixels associated with the tile and interpolation is performed to determine a color at pixel locations not sampled.

One embodiment of a graphics system includes a graphics processor and a graphics pipeline including an adaptive sampling generator and pixel shader. The adaptive sampling generator determines a required sample rate for each tile based at least in part on a speed of pixels of objects in each tile and selects a sample pattern based on the required sample rate. In one embodiment, the adaptive sampling generator determines a sample pattern and a sample rate for an individual tile based on a combination of the speed of objects in the individual tile and whether or not the individual tile includes an edge. In one embodiment, the graphics system includes an advection unit to perform advection, wherein for a tile having a velocity below a quasi-static speed limit, a sample pattern having a reduced sampling rate is selected and the advection unit fills in missing pixel data by reusing pixel data from a previous frame via advection. In one embodiment, the graphics system includes a reconstruction unit, wherein for a tile having a velocity above a threshold speed a reduced sampling rate is selected and missing pixel data is interpolated by the reconstruction unit.

BRIEF DESCRIPTION OF THE DRAWINGS

FIG. 6A illustrates an example of dithering sampling patterns to reduce visual artifacts in accordance with an embodiment of the present invention.

FIG. 9 illustrates an example of sampling pattern related to considerations for determining pre-computed weights in accordance with an embodiment of the present invention.

FIG. 10 illustrates an example of sampling pattern related to considerations for determining pre-computed weights in accordance with an embodiment of the present invention.

DETAILED DESCRIPTION

Example Graphics Pipeline System Overview

Figure 1:
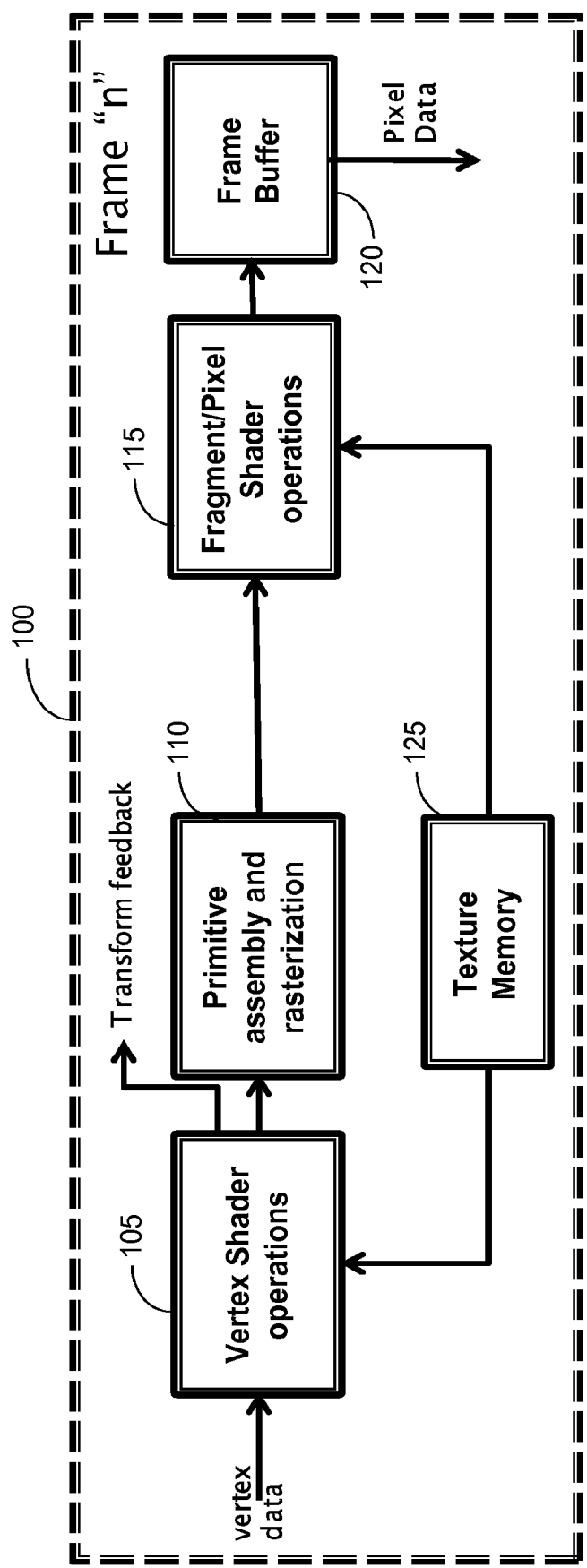
FIG. 1 illustrates a conventional graphics pipeline.
Figure 2:
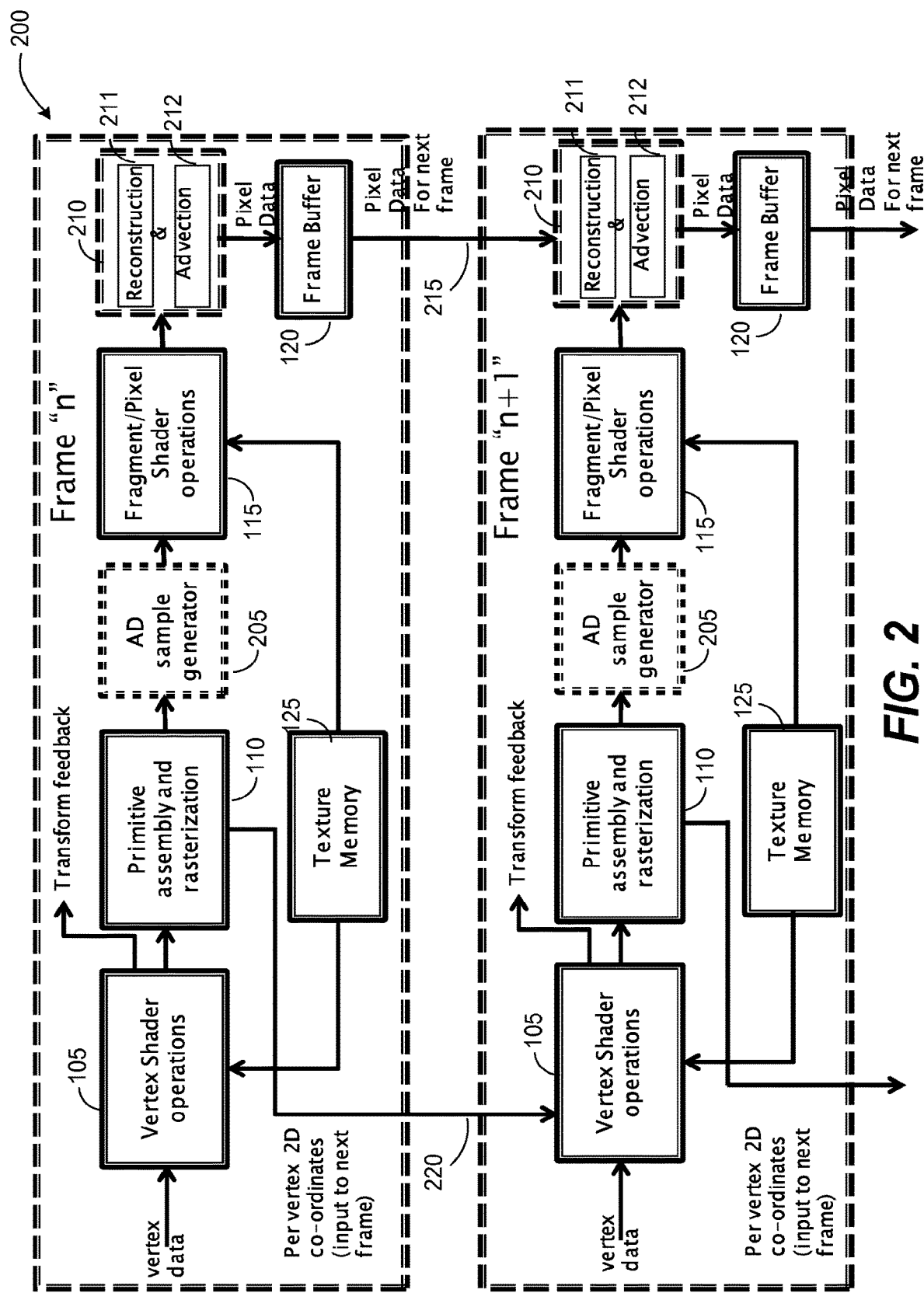
FIG. 2 illustrates a graphics pipeline in accordance with an embodiment of the present invention.

FIG. 2 illustrates a graphics pipeline 200 in accordance with an embodiment of the present invention. The graphics pipeline 200 may be implemented using a graphics processing unit (GPU) including graphics hardware. The graphics pipeline 200 includes several new stages and functions to support automatically determining regions of the frame that do not require all of the pixels in individual tiles (blocks of pixels) to be sampled and rendered in order to achieve an acceptable viewing experience for a human user. As used in this application, a tile is a contiguous set of pixels in an image, typically in block having a square shape. The term frame is commonly used to describe a set of operations performed to render an image that is read by a display at a preset frequency. However, the term frame is also used to refer to the rendered image resulting from the set of operations used to render the image.

In one embodiment, an adaptive desampling (AD) sample generator stage 205 is provided to support adjusting a sampling pattern in local regions of an image, where the local region is a tile corresponding to a block of pixels (e.g., a 4×4 block of pixels, 16×16, or other size). Desampling is the reduction in the number of samples per tile that are sampled and rendered in the current frame. For example, desampling may include sampling and rendering on average less than one sample per pixel in a tile, and thus may also be described as sub-sampling. To maintain full image resolution, two different approaches may be used to obtain values of missing pixel data. A reconstruction and advection stage 210 supports two different options to reduce the number of pixels that need to be sampled and rendered in a tile while maintaining visual quality for a user. The reconstruction and advection stage 210 includes a reconstruction submodule 211 and an advection submodule 212. In one embodiment, a first option to reduce the number of pixels rendered in a tile is reconstruction via higher order polynomial interpolation and filtering in a tile to generate missing pixel data for that tile. A second option to reduce the number of pixels rendered in a tile is advection, which includes identifying locations of one or more pixels in a previous frame and reusing pixels from the previous frame for a selected fraction of pixels in the tile.

In one embodiment, pixel data of frame "n" 215 of objects from frame n 220 is saved for possible reuse of pixel data in the next frame "n+1." Additionally, vertex coordinate data is saved for use in determining a frame-to-frame motion vector of pixels. In one embodiment, the pixel data and vertex coordinates from frame n are stored in a buffer memory for use in the next frame n+1.

Figure 3:
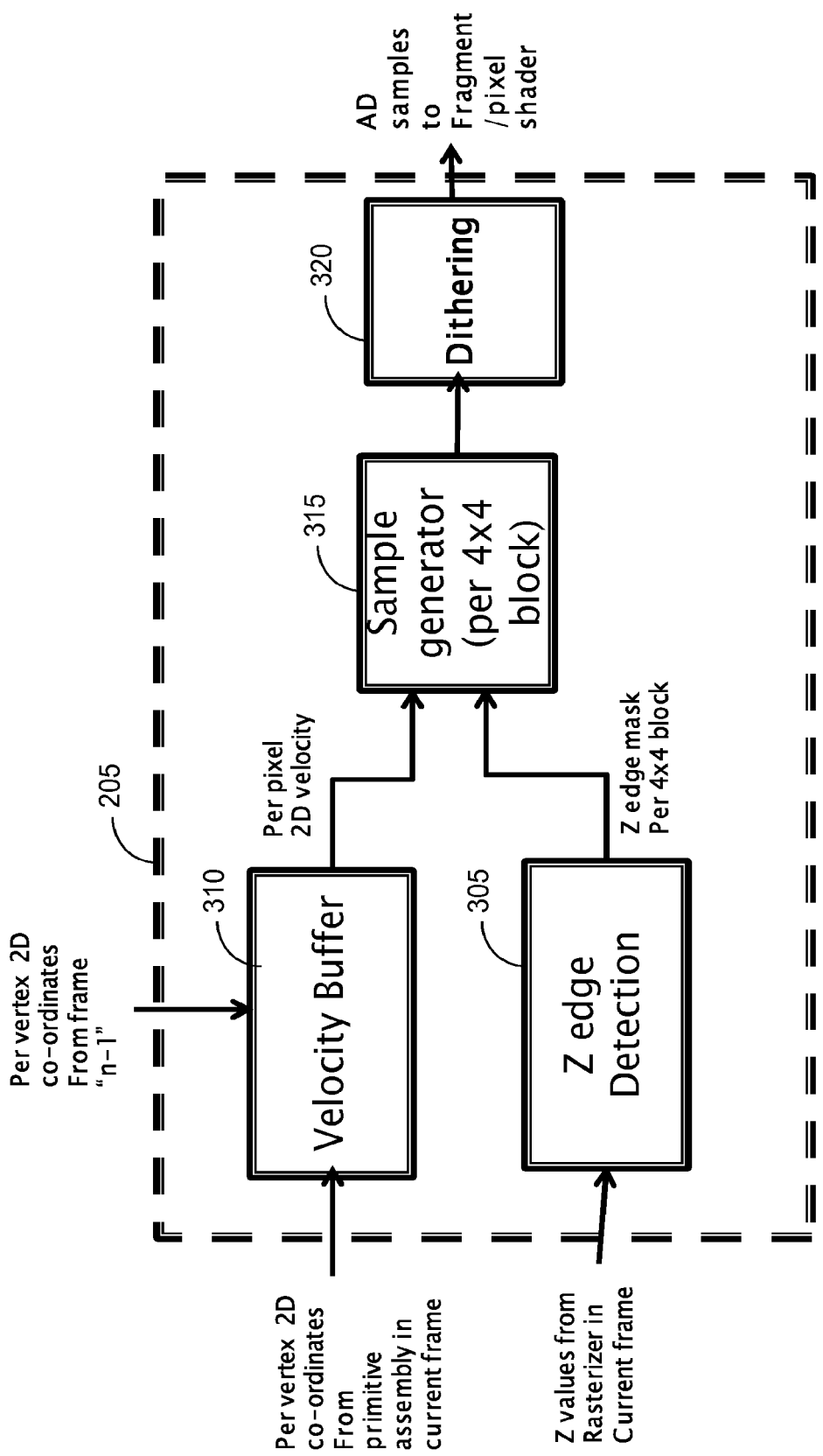
FIG. 3 illustrates an adaptive desampling generator in accordance with an embodiment of the present invention.

FIG. 3 illustrates an AD sample stage 205 in accordance with an embodiment of the present invention. In one embodiment, desampling decisions are made in local tile regions based on velocity and edge detection (e.g., edge detection in depth/Z). A velocity buffer 310 receives the per vertex coordinates from the current fame and from the previous frame. The velocity of an individual pixel may be determined by comparing the vertex coordinates of the pixel of the current frame with the vertex coordinates of the pixel in the previous frame. In one embodiment, a forward splatting approach is used by rendering a "velocity image" with primitives from the scene, and using a per-vertex velocity as a vertex attribute. Many graphics applications render a Z-buffer as a technique to reduce the number of pixel shader instances during rendering passes. A velocity buffer/image may be rendered with a Z-buffer. During the Z-pass, where the Z/depth buffer is generated, in addition to splatting and updating the depth, the velocity is also updated at each pixel. Rendering the velocity buffer results in per-pixel velocity values in screen space, the magnitude of which corresponds to a speed. A tile, such as a 4×4 tile, thus has a pixel speed associated with each pixel. The tile thus has a maximum pixel speed, mean pixel speed, median pixel speed, and minimum pixel speed. In one embodiment, the mean pixel speed is used to make desampling decisions, although more generally the maximum pixel speed or average pixel speed could also be used.

Visual artifacts are less perceptible to the human eye in moving objects. Thus, one factor in whether or not a sampling rate may be reduced in a tile is whether the speed is above a threshold speed.

However, certain types of visual artifacts tend to be more noticeable in edges in color. Strictly speaking, detecting color edges in a final image is not possible without rendering the image first. However, it is possible to detect, prior to rendering, a high likelihood of edges in color. Thus, in one embodiment, an edge detection module 305 detects the likelihood of edges in color in local blocks of pixels. That is, regions are detected in which there is a high likelihood of edges in color by assuming that there is a high likelihood of color variation across objects. In one embodiment, Z values from the rasterization of the current frame are analyzed to perform edge detection. A Laplace edge detector may be defined as stencil centered on a current pixel. Any pixel in the tile is marked as having an edge if the Laplacian of the z-buffer at the pixel is greater than a threshold value multiplied by the z-value at the pixel. This defines a one bit value per tile. More generally, any type of edge detection may be used.

In one embodiment, an edge mask is generated for individual tile and an edge state bit may be generated to indicate whether or not a tile includes at least one edge. In one implementation the edge mask is generated for each 4×4 block of pixels although more generally other tile sizes may be used. This information on velocity and the presence of an edge is used by a sample generator 315 to determine a sample pattern for a tile. In one embodiment, a full sampling resolution is utilized if an edge is detected. If no edge is detected and a tile has a speed greater than a first threshold speed a first reduced sampling rate is used. If no edge is detected and a tile has a speed above a second threshold speed a second reduced sampling rate is used. Other additional optional factors could also be considered in making a sampling rate decision. In one embodiment, the sample pattern options include full sample resolution (at least one sample per pixel), one-half resolution (one-half of the pixels sampled in each tile), and one-quarter resolution (one in four pixels sampled in each tile). More generally, a plurality of sampling rates may be provided that are controlled by threshold parameters for each sample rate. Additionally, the sample rates selected may be optimized for the block/tile size selected. Thus, while an illustrative example includes three sample rates of 4, 8, and 16 samples for 4×4 blocks, the approach may be varied based on block size or other considerations to have a set of sampling rates each controlled by threshold parameters for each sample rate. Thus, the number of sampling rates, N, may be more than three, depending on implementation details, such as block/tile size and other factors.

In one embodiment, a dithering module 320 is provided to adjust the sampling pattern from a selection of sampling patterns having the same effective sampling rate. The dithering may be a repetitive sequence (e.g., sample pattern 1, sample pattern 2, sample pattern 3, sample pattern 4) or include aspects of randomization.

The dithering of the sampling pattern by the dithering module 320 reduces the visual perception of sampling artifacts by human users. The human eye and the human brain starts to blend images into a video sequence when the rate is faster than a biological threshold. That is, when images vary at a rate faster than a biological threshold, the human eye blends the images across time and perceives them as a continuously varying sequence, akin to a video. There is some contention about what the exact number of the biological threshold is. At frame rates of about 12 frames per second, the human eye and brain begins to see a sequence of images that is moving instead of individual images. However, somewhat higher frame rates of about 15 frames per second are required to experience the beginnings of relatively fluid (non-jerky) movement. However, the nature of the underlying images is also an additional factor for whether or not a human observer perceives a fluid motion at a given frame rate. Thus, the human eye will tend to average out visual artifacts that are dithered at frames rates at about 12 frames per second and higher. In one embodiment, the dithering is performed such that every pixel is rendered at least fifteen frames per second, which is faster than the human eye can discern individual images. At 60 frames per second, dithering the sample pattern in a tile every four frames corresponds to rendering each pixel at least fifteen frames per second.

Exemplary Motion Speed Regimes

Figure 4:
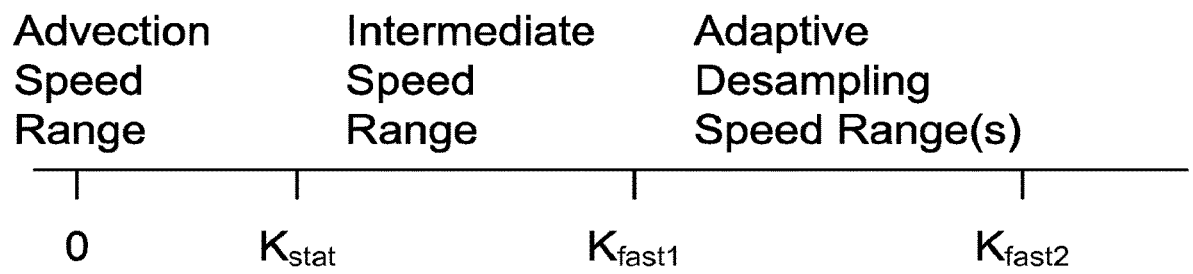
FIG. 4 illustrates an example of pixel speed considerations in performing adaptive rendering in accordance with an embodiment of the present invention.

FIG. 4 illustrates examples of speed regimes in accordance with an embodiment of the present invention. The motion is the combination of object motion and camera motion. The speed corresponds to the magnitude of the motion vector in a tile. In this example, the speed is an indicator of the number of samples needed in a block of pixels to have an acceptable visual quality. If the motion if above a certain threshold speed $K_{fast1}$ for a block of pixels, it is an indication that the number of samples may be decreased (e.g., eight samples in a 4×4 tile) because the human eye cannot perceive the high frequencies in a moving object. If the speed is above an even higher threshold speed $K_{fast2}$, it is an indicator that the number of samples in a tile may be reduced even further (e.g., four samples in a 4×4 tile). On the other hand, if the motion is very slow in a tile, below a speed $K_{stat}$ (or if there is no motion), then there may be an opportunity to reuse pixel data from the previous frame (e.g., render eight samples in a 4×4 tile and reuse eight color values from the previous frame via advection). The reuse of pixel data from the previous frame also requires that the graphics state does not change from the previous frame to the current frame, where the graphics state includes the shaders used, the constants provided to the shaders, and the geometry provided to the frames. There will be a speed regime where full sampling resolution is required. As an example, there may be an intermediate speed regime between $K_{stat}$ and $K_{fast1}$ in which a full sampling resolution is required to achieve a high visual quality. Additionally, there may be scenarios in which super-sampling is applied to individual tiles. As an illustrative example, an option may be provided to support super-sampling of a Z-edge case.

In one embodiment, desampling (changing the sample pattern to reduce the sampling rate below one sample per pixel) is permitted if the speed is above a first threshold speed $K_{fast1}$. In one embodiment, the sampling rate is permitted to be reduced further if the speed exceeds a second threshold speed $K_{fast2}$. A decision whether to perform desampling may also be dependent on other conditions, such as whether or not an edge is detected.

In one embodiment, motion in the camera screen space is obtained by differencing vertex position data from the current frame and the previous frame. A speed regime of a tile is classified on a tile-by-tile basis by calculating a magnitude of a motion vector based on how much a pixel of an object has moved from one frame to another. As previously discussed, in one embodiment, splatting is used in the Z-pass to determine per-pixel motion vectors. In one embodiment, speed thresholds are defined and used as inputs to make decisions on whether adaptive desampling or advection are to be used for a current frame. One speed regime is a quasi-static regime in which an object moves slowly enough that pixels of the object are unlikely to differ significantly from their previous image counterparts. If the speed is within the quasi static speed limit, a decision may be made whether advection may be used to reuse pixels from a previous frame. In one embodiment, an upper bound on a quasi-static speed, $K_{stat}$ is that a pixel in a given tile (tile m) in frame n remains in the same tile in frame n+1. In one embodiment, if the speed is below $K_{stat}$, additional checks are performed to determine if pixels from the previous frame may be used in the current frame. This may include a check that advection produced an acceptable result in a previous frame. Additionally, a check may be performed to check that the pixel values for the tile in the current frame are consistent with a small movement over the previous frame, which may be described as a discrepancy check. An advection discrepancy state bit may be associated with a tile to indicate that it has passed one or more discrepancy checks to confirm that the tile is suitable for advection of at least some of the pixel data.

Figure 5:
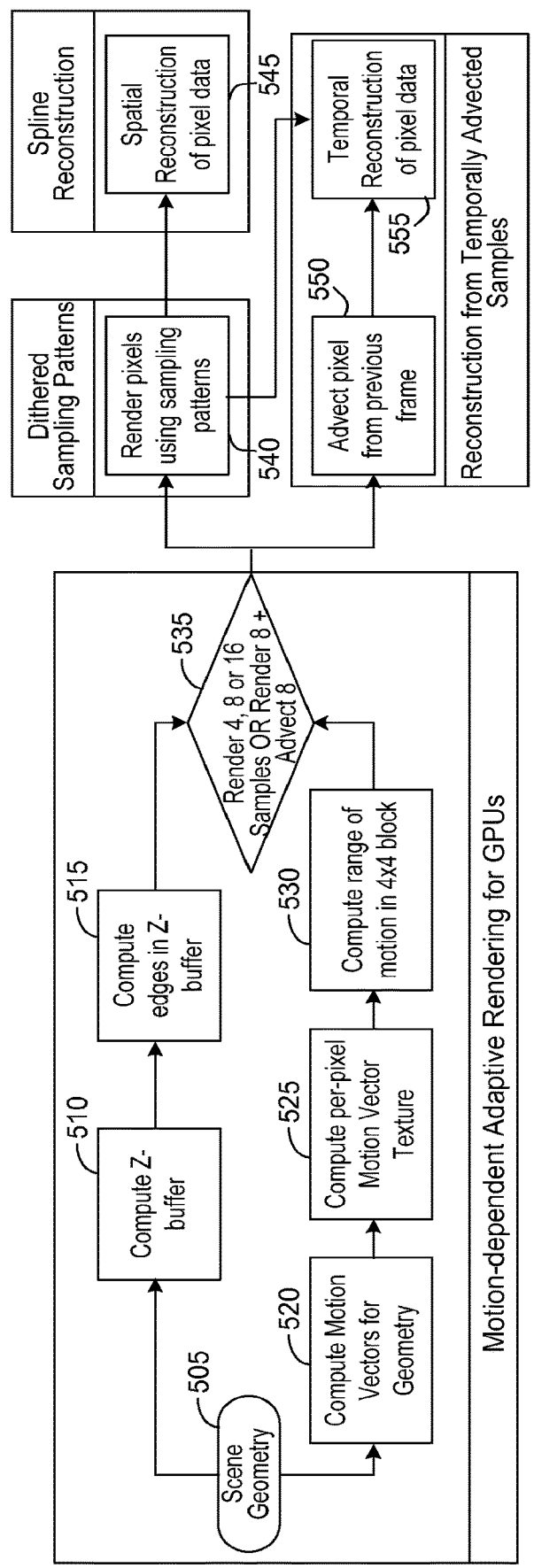
FIG. 5 is a flow chart illustrating rendering and reconstruction options in accordance with an embodiment of the present invention.

FIG. 5 is a flowchart illustrating an example of adaptive rendering choices based on speed, edge detection, dithering, spline reconstruction and advection. Some conventional graphics pipeline features are omitted for clarity. FIG. 5 illustrates a specific example in which 4×4 tiles are used in accordance with an embodiment of the present invention. An initial pre-pass may be performed followed by a color pass to render pixel data. The scene geometry 505 of an image is provided by the application. The Z-buffer is computed 510 and edge detection is performed 515. Motion vectors are computed 520 for the scene geometry. The per-pixel motion vector is computed 525. The range of motion in a tile is computed 530. Based upon this information, a decision 535 is made whether to: 1) render 4, 8, or 16 samples in a 4×4 block 535 and perform interpolation or 2) to render 8 and advect 8. Dithering 540 is performed for the sampling patterns. Spline reconstruction 545 is utilized to reconstruct pixel data. If advection is used, then advection 550 is used to obtain 8 of the pixel values and the rest are obtained by rendering.

Exemplary Sampling Patterns and Dithering

FIG. 6A illustrates an example of sampling patterns and dithering. In this example the tile size is a 4×4 block of pixels. Full resolution corresponds to 16 samples. Half-resolution (8 samples) and one-quarter resolution (four samples) permits variations in the pattern of the samples. Thus, for the case of 8 samples, the arrangement of the samples can have a first sample pattern, second sample pattern, third sample pattern, etc. Having pre-defined sampling patterns supports dithering of the sample pattern for temporal color averaging. The pre-defined sampling patterns are selected to rotate the sampling so that every pixel location is rendered once every few frames. The dithering of the sample pattern can be achieved by different techniques. In one embodiment, the choice of sample pattern in an individual frame can be selected by the dithering module 320 in a sequence by a modulo k counter. Dithering sample positions in time over multiple frames makes rendering errors harder for a human observer to see. In one embodiment, the sample patterns are selected so that each pixel is guaranteed to be rendered at least once every k frames, where (n*n)/k is the minimum number of samples per n×n tile. In another embodiment, temporal dithering is implemented using a stochastic approach to select the sample pattern.

Figure 6B:
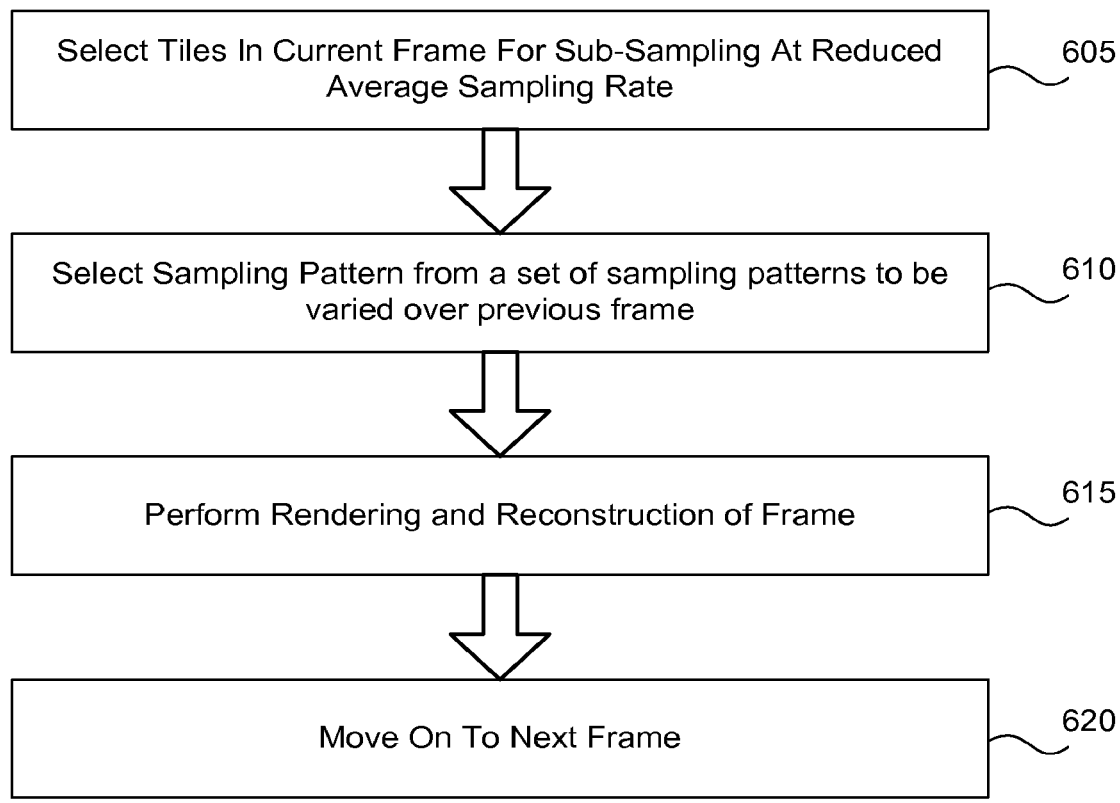
FIG. 6B illustrates a general method of performing dithering of sample patterns in accordance with an embodiment of the present invention.

FIG. 6B illustrates a method of dithering in accordance with an embodiment of the present invention. Tiles in a current frame are selected 605 for sub-sampling at a reduced average sampling rate. For each tile, a sampling pattern is selected 610 to be varied over the previous frame. Rendering and reconstruction is performed 615. If additional frames are to be rendered, the process continues.

Advection Example

Figure 7A:
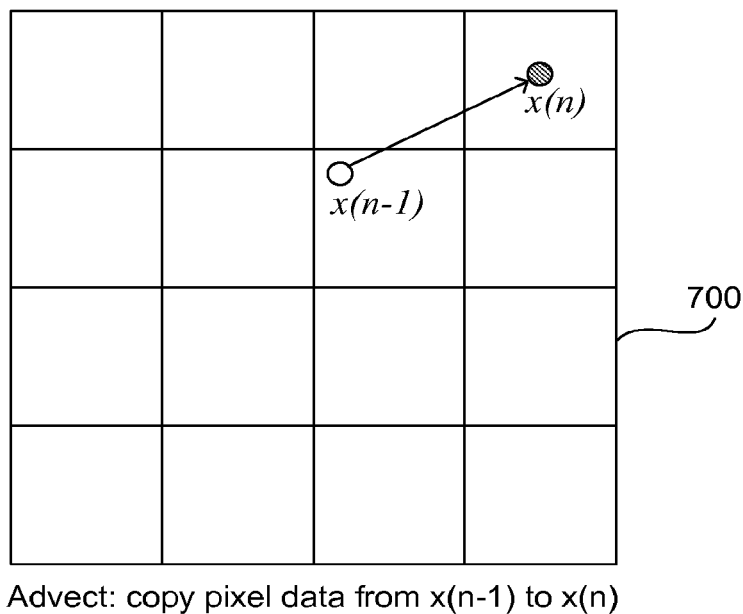
FIG. 7A illustrates an example of advection in accordance with an embodiment of the present invention.
Figure 7A:
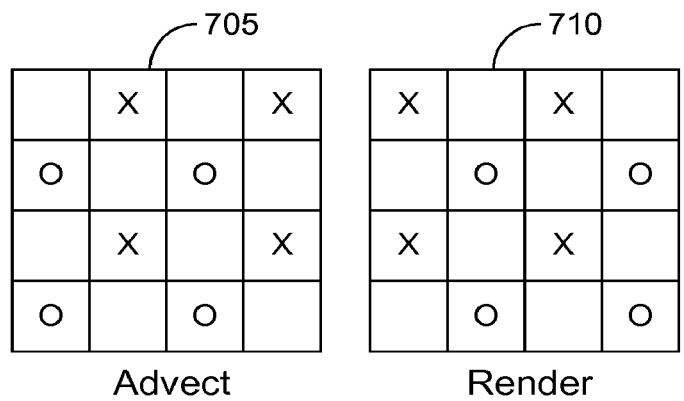

FIG. 7A illustrates an example of advection. In a tile region, such as a 4×4 tile 700, advection including copying pixel data from pixel at a given location in the previous frame to the corresponding location in the current frame. For example, an individual object (e.g., a ball slowly moving across the ground) may move across the screen such that every pixel of the ball moves with a velocity. In this example there is a high level of temporal coherence between the pixels of the slowly moving ball from one frame to another. In this case, the changes are primarily motion. By determining the motion of individual pixels of the ball across frames, pixel data may be copied across frames. In this example, the motion is slow enough that pixel data can be mapped form a current pixel location to a pixel in the same tile in a previous frame. The position of a pixel in a previous frame may be computed as $x(n-1)=x-mv(x)$, where $mv(x)$ is the motion vector. As a result this permits pixel data to be copied from $x(n-1)$ to $x(n)$. That is, if the motion of the pixel is small between frames then the pixel location in the current frame may be projected back to a pixel in the previous frame and the pixel data from the previous frame copied. Bilinear or any higher order interpolation may be used if $x(n-1)$ has decimal components.

In the example of FIG. 7A, advection is mixed with rendering. In one embodiment, advection is used for half of the pixels 705 in a tile and the other half of the pixels are rendered 710. Mixing advection and rendering in a single frame reduces visual artifacts associated with performing only advection. That is, it minimizes the likelihood of visual errors due to advection detectable by typical human viewers. In conjunction with temporal dithering, it ensures that errors do not accumulate over time, thus reducing the likelihood of visual errors being noticed by typical human viewers. While a 1:1 ratio of rendered pixels and advected pixels is one option, more generally other ratios could be utilized.

As previously discussed, in one embodiment, a maximum speed is used as condition for whether advection is permitted. In one embodiment, the criteria is that the threshold speed is low enough that local deformation of pixel positions in a small neighborhood can be classified as a rigid transformation in which the change in the positions of the pixels can be represented using one of translation and one rotation for an entire set of pixels to within a desired accuracy. For example, the maximum speed for advection can be that the magnitude of the pixel motion is below a threshold of k pixels. While it is possible that rigid transforms can occur at any speed, the likelihood decreases with increasing speed such that a speed threshold may be used as a criterion for when advection is likely to be beneficial. A discrepancy check may be performed for individual tiles to determine whether or not advection produces acceptable results. This discrepancy check can be performed in a current frame and written out as 1-bit value for each tile to let the next frame make a determination whether or not to disable advection in the neighborhood of a tile failing the discrepancy check if the check indicates that the advected results were inaccurate. That is, in this implementation advection is performed for a tile in frame n and the discrepancy check is performed in frame n and consumed by frame n+1. Frame n+1 then uses the discrepancy check (computed in frame n) to determine whether or not to perform advection in a neighborhood about a tile in frame n+1. If the discrepancy check in frame n indicates the advection result was acceptable, advection is allowed in frame n+1. If not, the advection is turned off for a selected number of frames. The discrepancy check is a check based on whether or not there is a significant change in pixel values of a tile inconsistent with the underlying assumptions of valid advection. If the pixels of an object are slowly moving then a tile is not expected to change significantly between two frames. Thus, if the state of the tile changes significantly the discrepancy check fails. A tile state discrepancy bit (e.g., 0 or 1) may be used to indicate whether the discrepancy check passes. The degree to which changes in tile state are permitted may be determined empirically or heuristically based, for example, in the tradeoffs between the computational benefits of advection and minimizing the appearance of visual artifacts.

Other ways of performing discrepancy checks may be utilized. There are computational benefits to performing advection in a tile of current frame n, performing a discrepancy check, and then utilizing the discrepancy check to determine whether or not to perform advection in frame n+1. However, it will be understood that an alternate implementation of the discrepancy check may be utilized in which the discrepancy check is performed in frame n and used to determine whether or not to utilize advection in frame n to reuse pixels from the previous frame.

The accuracy can be improved, if desired, using various enhancements. In one embodiment, back and forth error correction and compensation (BFECC) is used. BFECC utilized the position determined from Semi-Lagrangian advection and adds the velocity at that coordinate to obtain a new position in the current frame. If there is no error, this coordinate should be the same as the original position (x, y). Otherwise by subtracting half of this error from $(x-v_x, y-v_y)$ the second-order accurate estimate of the position is obtained, which is accurate to half a pixel, assuming that the velocity is pixel accurate.

Figure 7B:
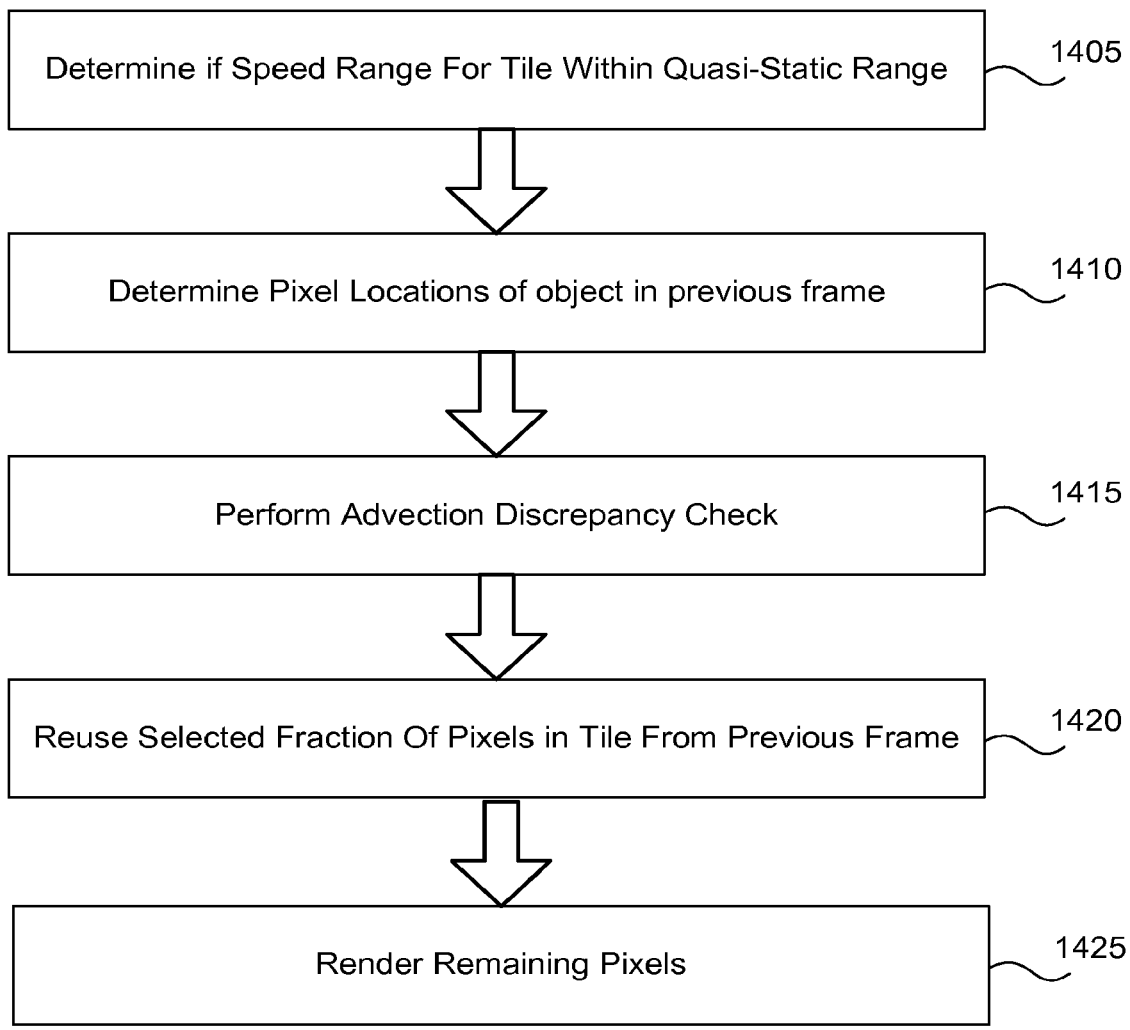
FIG. 7B illustrates a general method of performing advection in a graphics system in accordance with an embodiment of the present invention.

FIG. 7B illustrates a general method of performing advection in accordance with an embodiment of the present invention. A determination is made 1405 if the tile is suitable for advection. The suitability is based on whether the speed range is within the quasi-static range, augmented by passing any additional discrepancy checks. If the tile is suitable for advection, then a determination is made in block 1410 of corresponding pixel locations in the previous frame. A selected fraction of pixels are reused 1420 from a tile of a previous fame. The remaining pixels are rendered 1425.

Image Interpolation and Reconstruction Examples

Figure 8:
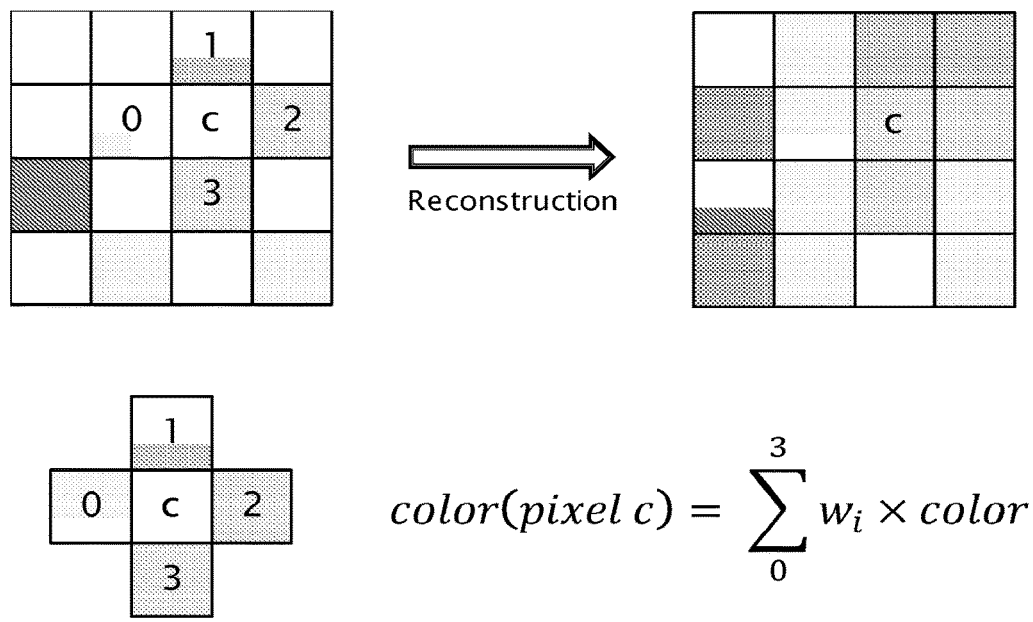
FIG. 8 illustrates an example of using pre-computed weights to perform cubic spline interpolation in accordance with an embodiment of the present invention.

FIG. 8 illustrates an example of image interpolation and reconstruction of pixel color values for the situation of desampling. In one embodiment, a weighted summation of color values is used to reconstruct unrendered pixels. For a given choice of the weight function w, a normalized set of weights can be precomputed for each configuration of pixels arising from a particular sampling pattern. For example, if 4 pixels are rendered in a 4×4 block, the remaining 12 pixels can be expressed using a weighted sum of rendered pixels within the same block, as well as its neighboring blocks. In addition, since the set of possible pixel configurations in the neighboring blocks is restricted by the set of sampling patterns, for this case, all possible weight sets can be precomputed.

Traditionally, a GPU utilizes bilinear interpolation. However, bilinear interpolation has various drawbacks. In one embodiment higher order polynomials having an order of at least three, such as piece-wise cubic polynomials (also known as cubic splines), are used for efficient reconstruction of sparse samples.

Higher order polynomials, such as cubic splines, are capable of mapping a larger frequency spectrum than bilinear interpolation and provide a greater fidelity of data reconstructed from sub-sampled blocks. Additionally, when using bilinear interpolation, samples are preferred on both sides of a pixel, as one-sided linear extrapolation is likely to be inaccurate, as well as exceed the color spectrum range. In contrast, higher-order polynomials using a wider support (>1 pixel away) are more likely to accurately approximate the functional form of rendered image data. While a variety of higher order polynomials could be used, a cubic spline has continuity characteristics that are superior to those of quadratic polynomials. Owing to the edge-detection step performed before desampling, a tile undergoing reconstruction is unlikely to have sharp discontinuities, where higher-order polynomial reconstruction may perform poorly.

One aspect of performing sub-sampling is that there is a sparse sample data at runtime. In an individual block region, such as a k×k pixel region, desampling may result in a subset of pixels being rendered, such as four or eight pixels from a 4×4 block of pixels. The missing pixel data needs to be reconstructed. A consequence of having predetermined sample patterns is that there is a finite set of possible sample locations. This permits a fixed set of local stencils to be created prior to run time, stored, and used to reconstruct pixel data using cubic splines or other higher order polynomials. Conventional approaches to evaluating higher order polynomials in hardware are computationally expensive. In contrast, in embodiments of the present invention the use of a fixed set of pre-computed stencils eliminates the computational overhead, during runtime, of performing a conventional higher order polynomial evaluation. The use of a static set of samples allows the determination of possible configurations of pixels that may need to be reconstructed, and thus the stencils that are required may be pre-computed.

In one embodiment, the higher order polynomial interpolation is implemented as static stencil operations using pre-computed weights. In one embodiment, a table of stencils is stored and made available for spatial reconstruction to a reconstruction submodule 211 of the reconstruction and advection stage 210. The table of stencils provides weights based on known sample positions. In one embodiment, the table of stencils has all of the stencil weights pre-computed for each pixel location within a defined sample pattern. The pre-computed weights permit the higher order polynomial reconstruction to be performed using static stencil operations.

In one embodiment, a set of 5×5 stencils is determined for all possible pixel locations in a tile (e.g., a 4×4 tile) that may need to be interpolated during runtime. Each 5×5 stencil is computed for each pixel location and neighbor configuration. Each stencil provides a list of weight values and corresponding locations of sample points. The stencils are stored in a constant memory table available for reconstruction purposes to the reconstruction submodule 211 of reconstruction and advection stage 210. In one embodiment, at run-time, for each pixel that must be interpolated, an index is computed into this table using the pixel coordinates and sampling mask. In one implementation each stencil is addressed using: (a) the pixel's location within a tile, and (b) the sampling mask used for rendering. Thus, if dithering is employed, the stencil that is selected will depend on which sample pattern is selected for a given degree of subsampling.

In one embodiment, the higher order polynomial interpolation is performed using a multiplier/adder to accumulate the products of weights and sample color values. The accumulated value is then normalized by division, which in many cases can be performed by a bit shift for integer formats, or by subtraction for floating point formats. Thus, the use of stencils with pre-computed weights permits the higher order polynomial interpolation to be calculated at run time with comparatively little computational effort.

An example of a cubic spline functions used for reconstruction and to compute pixel color values as a weighted sum of known pixel color values is as follows:

In one embodiment, a formula expressing a weighted sum to determine a pixel color value is based weights w( ) as follows:

$$c(i, j) = \frac{\sum\limits_{(a,b)\in Filled} w(i-a, j-b)c(a, b)}{\sum\limits_{(a,b)\in Filled} w(i-a, j-b)}$$

Where c(i, j) is the color value at pixel location (i, j), w( ) is the two dimensional spline function and "Filled" is the set of pixels that were rendered. The two-dimensional spline function is the product of two one-dimensional spline functions or w(i,j)=k(i)k(j), where the one dimensional spline function k( ) is based on the cubic filter formula described in the paper by Don P. Mitchell and Arun N. Netravali, "Reconstruction Filters in Computer Graphics," Computer Graphics, Volume 22, Number 4, August 1988, pp. 221-228:

$$k(x) = \frac{1}{6} \begin{cases} (12-9B-6c)|x|^3 + (-18+12B+6C)|x|^2 + (6-2B) & \text{if } |x| < 1 \\ (-B-6C)|x|^3 + (6B+30C)|x|^2 + \\ \quad (-12B-48C)|x| + (8B+24C) & \text{if } 1 \le |x| \le 2 \\ 0 & \text{otherwise} \end{cases}$$

The distances in the Mitchell and Netravali paper are defined in a scaled pixel space:

$$B=C=\frac{1}{3}$$

By restricting the relative positioning of sample points, the weights and denominators can be pre-computed into stencils. Because the spline function is defined in a bounded fashion, scaling of the magnitude of x can be used to extend the functions to a desired support radius, such as a 2 pixel support radius.

For a tile of size n×n, it is possible to arrange a k×k square in (n/k)*(n/k) possible configurations. A sampling rate of 4*s requires s squares, leading to (n*n)/(k*k*s) sampling patterns.

FIG. 9 illustrates an example of sampling pattern in a 4×4 tile in which the Xs mark rendered samples and the O marks an interpolation location. A 5×5 stencil is used that is centered at O. Assuming any access outside this 4×4 tile is invalid, the stencil has 0 weights for any locations outside the 4×4 tile, which are removed from the stencil table. Assuming the top left pixel to be (0, 0), the table entry then reads the locations required as (0, 0), (2, 0), (0, 2), (2, 2), with appropriate weights w0, w1, w2, w3, and the normalization factor w. The weighted summation can then be computed as 1/w (w0*c(0, 0)+w1*c(2, 0)+w2*c(0, 2)+w3*c (2, 2)) for each color component by using a multiply-and-accumulate operation. However, more generally, the reconstruction is not limited to one tile but a region of influence of a stencil may extend to neighboring 4×4 blocks as well.

Assuming a 5×5 stencil, there are 24 values in all to be pre-computed (the center is always 0 since the pixel itself has no color value). Of those, at most half can be rendered if 8 samples are used per 4×4 tile, leaving 12 values. In one embodiment, each stencil is implemented to include a 4-bit count of the number of non-zero weights, followed by 8-bit weights stored in one chunk, followed by 2 chunks of 3-bit coordinate offsets for the x and y coordinates relative to the center.

In one embodiment, the stencils are stored in order of the sampling patterns. In one embodiment the different sampling patterns for the same sampling rate are rotations of each other, so there are two sets of patterns. These can be stored in row major order within a 4×4, with an index list to point to the data for pixel (i, j). For rotations of the sampling mask, the coordinates are transformed appropriately.

Referring to FIG. 10, consider the case of a 4×4 tile of pixels, in which 8 samples out of the possible 16 are rendered. In this example, stencils are defined for each unknown pixel given the weight function. These stencils can be retrieved at runtime from a pre-defined set of stencils. For the example case of cubic stencils with a support radius of 2 pixels, these stencils would be of size 5×5 if no super-sampling is performed. If it is essential to restrict accesses to a k×k tile region, the stencils can be modified appropriately to have 0 weights for such pixels which fall outside the tile. It is important to note that the number of samples does not need to be less than the number of pixels. In regions where super-sampling is desired for anti-aliasing, the number of samples may exceed the number of pixels, e.g. 32 samples for a 16 pixel 4×4 tile. Appropriate pre-computed stencils would be added for those cases.

In one embodiment, each sampling pattern is defined as combination of sparse square patterns (e.g., four samples to be rendered in a square pattern). Selecting square patterns is useful in applications in which groups of four pixels (quads) are a default unit of processing. However, more generally other arrangements of sampling positions could be used in the sampling patterns. In one embodiment, the sample patterns are squares of size 3×3 within a 4×4 tiles. Thus, adjacent vertices are 2 pixels apart along each axis.

In one embodiment, the same sampling pattern is used for all regions of an individual frame that are sub-sampled at a given sampling rate. In this embodiment, the same sampling pattern is used in all of the tiles sub-sampled at a given sample rate because this results in consistent spacing of sample positions within every frame, simplifying reconstruction routines.

In one embodiment, the sampling patterns are based on quads to exploit Single instruction multiple data (SIMD) processing units. Consistent spacing of samples provides robust interpolation and aids in achieving full pixel resolution in a final image.

Figure 11:
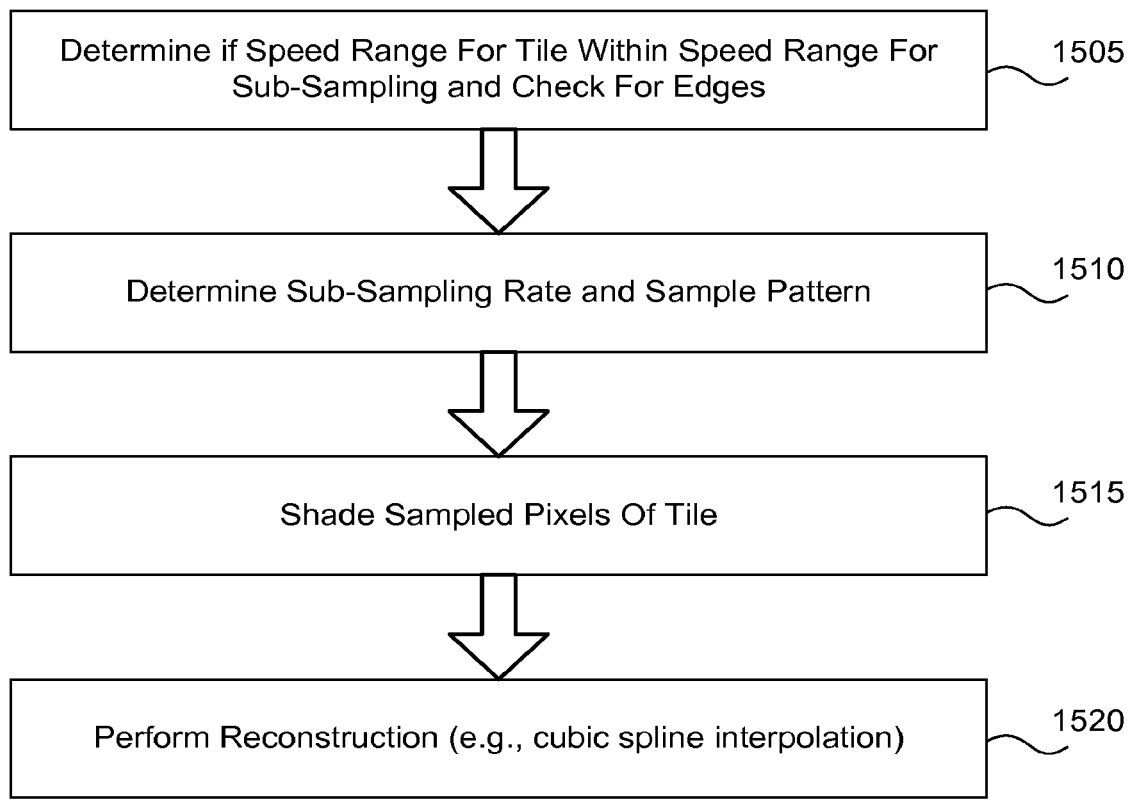
FIG. 11 illustrates a general method of adaptive desampling in accordance with an embodiment of the present invention.

FIG. 11 illustrates a general method of adaptive desampling and spline interpolation in accordance with an embodiment of the present invention. A determination is made 1005 if the speed range of the tile is within the speed range for sub-sampling and a check is made for the presence of edges. A determination 1010 is made of the sub-sampling rate and a sample pattern is chosen. The pixels of the tile are shaded 1015 based on the sampling pattern. Reconstruction is performed 1020 to interpolate missing pixel values, where spline interpolation may be performed.

Figure 12:
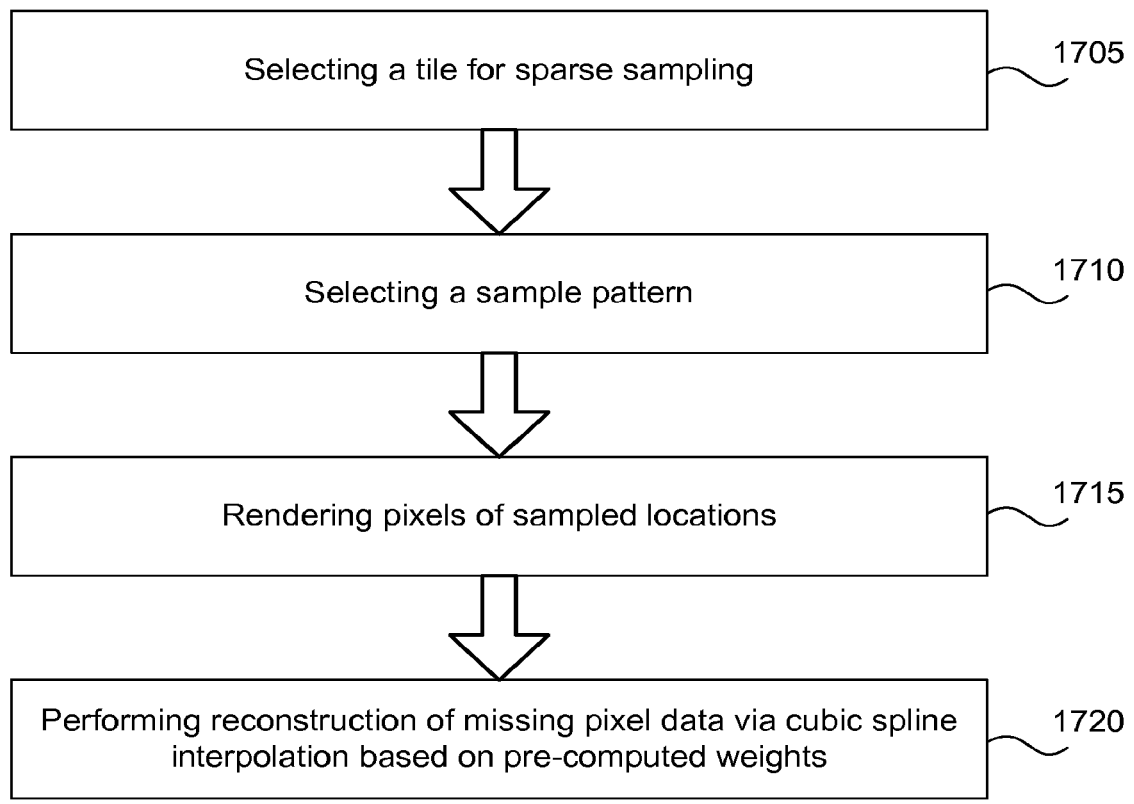
FIG. 12 illustrates a general method of performing cubic spline interpolation in a graphics system in accordance with an embodiment of the present invention.

FIG. 12 illustrates a method of performing cubic spline interpolation in accordance with an embodiment of the present invention. A tile is selected for sparse sampling 1105. A sample pattern is selected 1110. Pixels are rendered 1115 for the sampled locations. Reconstruction is performed of missing pixel data via cubic spline interpolation based on pre-computed weights 1120.

Figure 13:
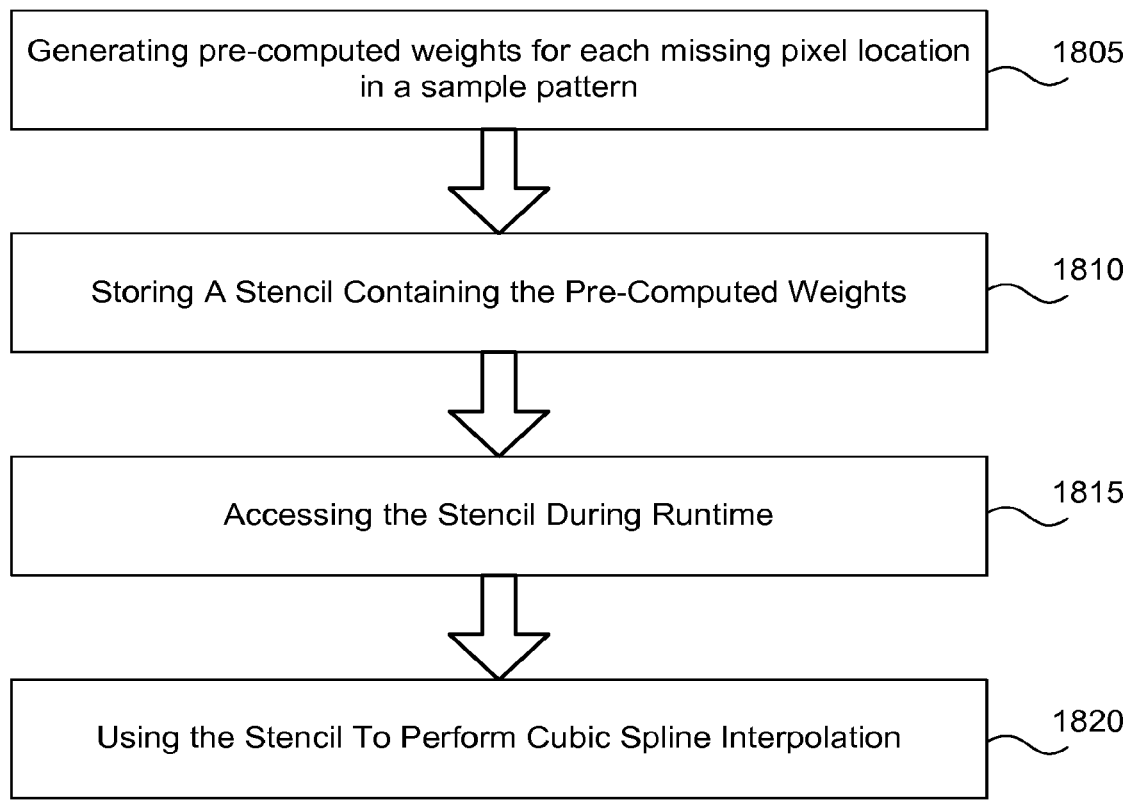
FIG. 13 illustrates a general method of performing cubic spline interpolation in a graphics system in accordance with an embodiment of the present invention.

FIG. 13 illustrates a method of utilizing stencils containing pre-computed weights in accordance with an embodiment of the present invention. Pre-computed weights are generated for each missing pixel location in a sample pattern 1205. A stencil containing the pre-computed weights is stored 1210. The stored stencil is accessed during runtime 1215. The accessed stencil I used to perform cubic spline interpolation 1220.

Example Comparison of Advection and Reconstruction

Figure 14:
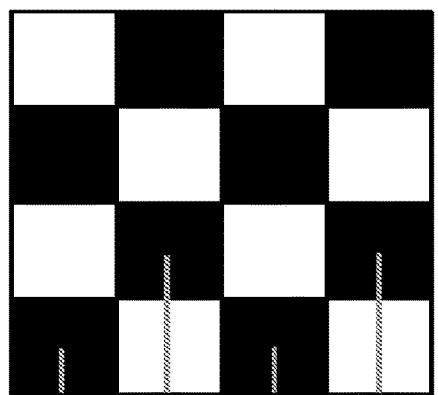
FIG. 14 illustrates an example of differences between advection and spline reconstruction.
Figure 14:
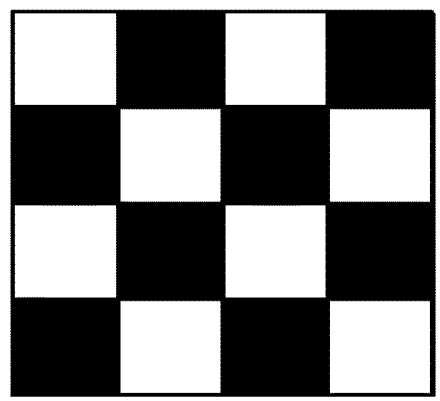
Figure 14:
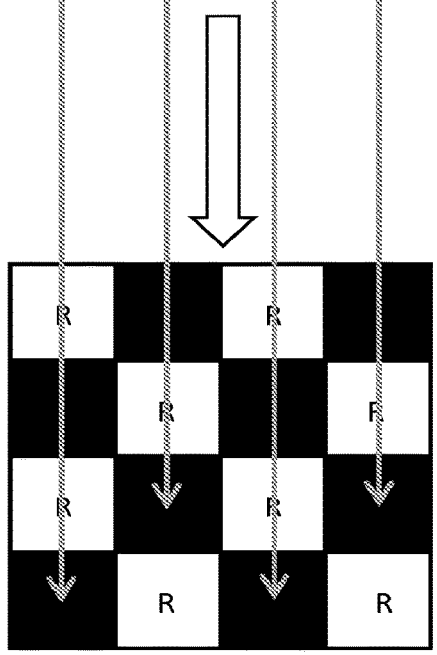
Figure 14:
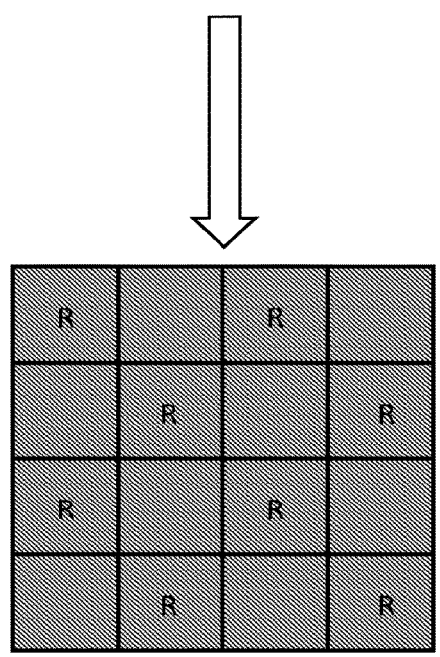

FIG. 14 illustrates an example of aspects of advection and reconstruction via cubic splines. The tile size is a 4×4 tile size. The pixel pattern in the previous frame is a checkerboard pattern. The rendered pixel values are denoted by an R. In the example on the left, advection is performed to reuse half of the pixel color data from the previous frame in a 4×4 tile. The velocity associated with the tile is very low and half of the pixels are advected by copying them from pixel values of the previous frame. Arrows are shown for four of the pixels to indicate reuse of pixel data from the same tile in the previous frame. In this case the color information is copied with no bleeding of color. In the example on the right there is a significant tile speed, corresponding to a half-pixel displacement per frame. In this example reconstruction is performed based on cubic spline interpolation. The velocity along x a 0.5 pixels leads to each rendered pixel having grey exactly halfway between black and white. The reconstructed pixels thus have the same value. That is, the color values are correct, and a full resolution render would also create the same values.

Automatic Tile-by-Tile Adaptive Rendering Example

Figure 15A:
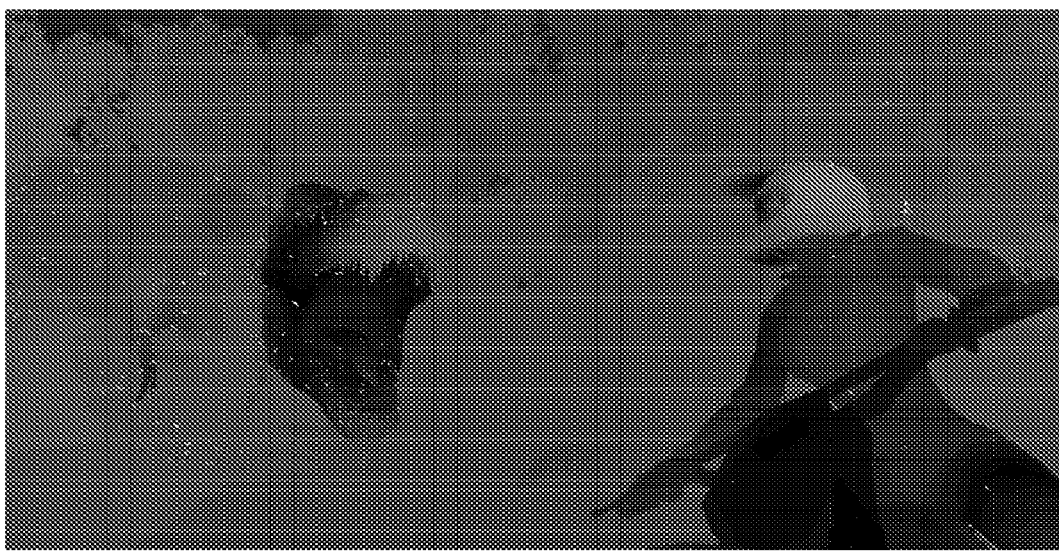
FIGS. 15A and 15B illustrates an example in which different regions of a frame are adaptively rendered using different approaches based on a magnitude of per-pixel velocity.
Figure 15B:
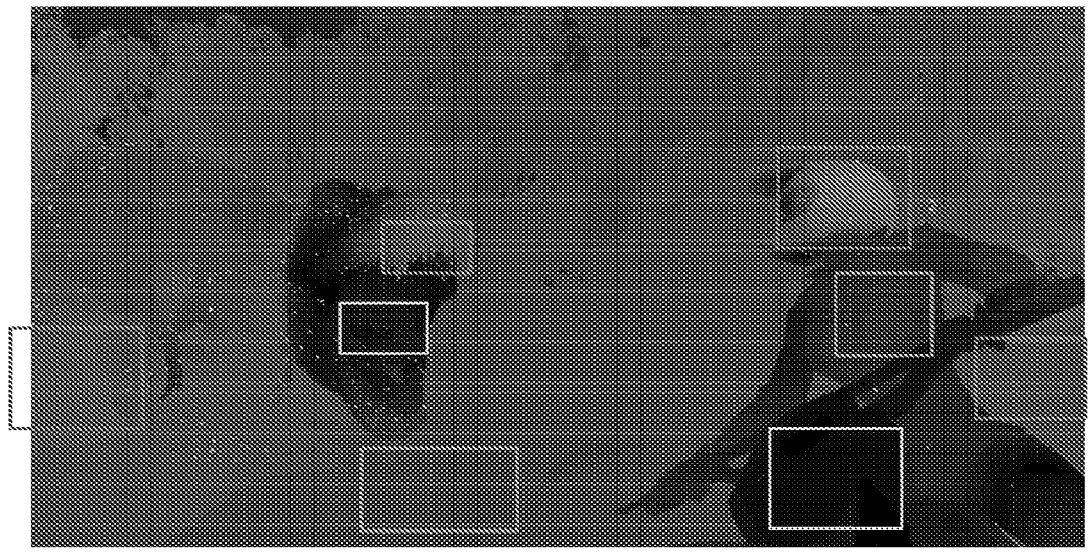

FIG. 15A illustrates an example of a frame in which the scene has regions in which the pixel velocity differs from other regions and some regions include color edges. As an example, the scene may include a rider on a motorcycle as well as stationary objects and quasi-stationary objects, such as plants moving slowly in the wind. Thus, there are regions that can be classified in different speed regimes. Consequently, as indicated by the boxes in FIG. 15B, different regions of the scene have different pixel velocities, with some of the regions providing different opportunities for adaptive rendering. As a result, in an individual frame the system automatically analyzes individual tiles and makes a determination on a tile-by-tile basis whether to desample and perform advection, desample and perform cubic spline interpolation, or utilize a normal default sampling scheme. Individual decisions may also be made on a tile basis whether or not to perform super-sampling. As the system automatically performs this optimization, no special inputs from an application developer are required, assuming relevant parameter values are defined separately.

Stereoscopic Rendering Example

Figure 16:
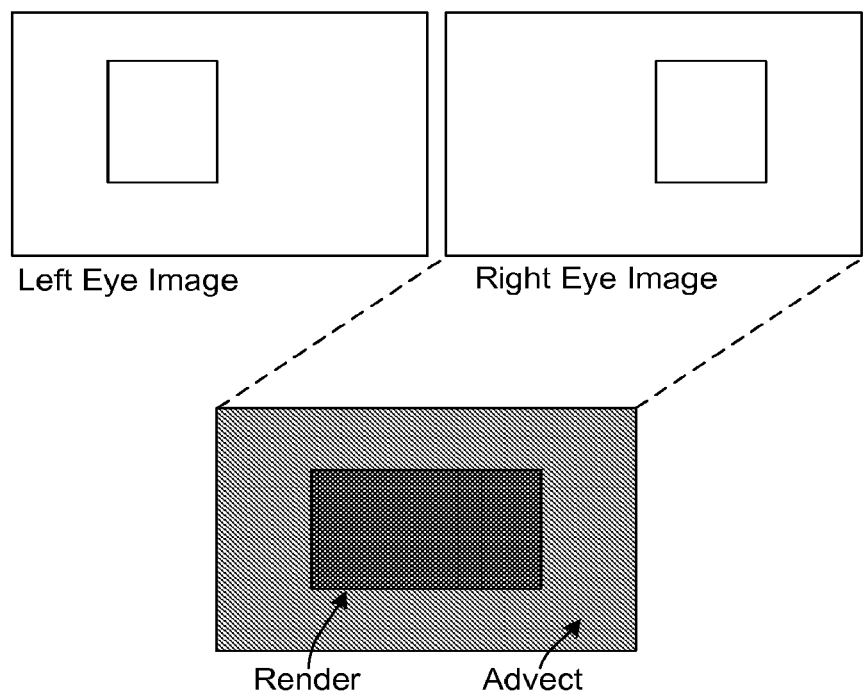
FIG. 16 illustrates an example of using advection for stereoscopic rendering in accordance with an embodiment of the present invention.

Embodiments of the present invention may be used to generate a single (non-stereoscopic) display. However, it may also be applied to stereoscopic rendering for virtual reality applications. Referring to FIG. 16, consider the case where separate images are generated for each eye, corresponding to a left eye image and a right eye image. Advection may be used to improve the efficiency of the stereoscopic rendering. In one embodiment a left image is generated. A translation motion, motion$_{trans}$, is defined as the translation to transform portions of the left-eye image to a right eye image. In one embodiment, the sample generator decision making is augmented to make a sampling decision for the right image to attempt to advect pixel values from the left image. In one embodiment, the sampling is Z-based and a test is performed whether a minimum Z of the left image and right image are greater than a threshold Z. If the min (Zleft, Zright)>Zthresh, pixels are advected from the left frame to the right using the motion$_{trans}$. Otherwise rendering is based on the motion based sampling rate. As illustrated in FIG. 11, this results in the right eye image being a combination of advected pixels from the left-eye image and rendered pixels.

Foveated Rendering Using Adaptive Rendering

Figure 17:
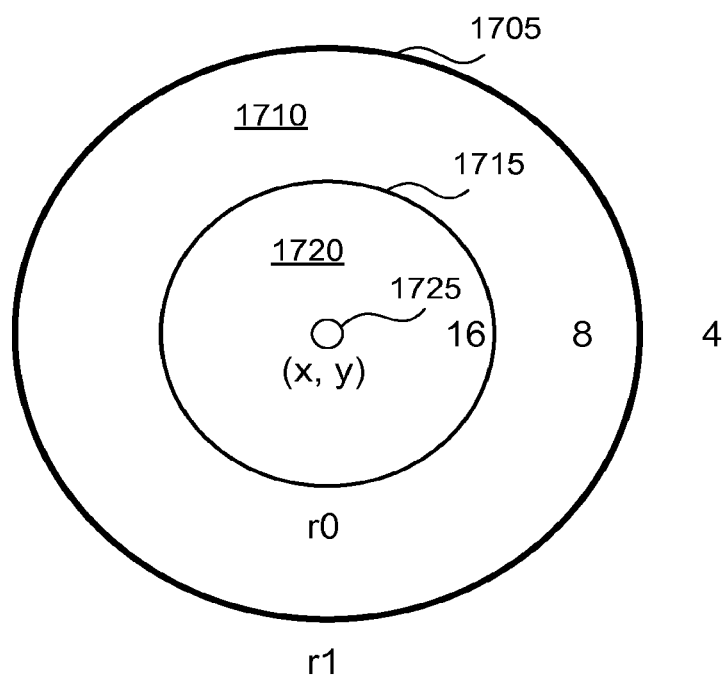
FIG. 17 illustrates adaptive rendering applied to foveated rendering in accordance with an embodiment of the present invention.

FIG. 17 illustrates an embodiment in which adaptive rendering is applied to foveated rendering. The structure of the human retina of the eye has a fovea portion that provides the highest visual acuity in a healthy human eye. The greatest visual acuity of a healthy human eye is within a small cone of angles and drops off with increasing angular distance. Foveated rendering renders higher detail near where the user is looking and lowers the detail further from the focus point. FIG. 17 illustrates a focal point (x,y) 1725. The sampling rate is decreased with increasing radial distance from the focal point (e.g., 1/(distance from the focal point). The decrease may be performed in a stepwise fashion at specific radial distance. For example, a specific number of samples may be rendered in a circular region 1720 up to a radial distance r0 1715. A lower number of samples are rendered in the annular region 1710 from r0 to r1 1705. An even lower number of samples are rendered in the region having a radial distance greater than r1. As an illustrative example, 16 samples may be rendered in the region between (x,y) and r0, 8 samples rendered in the region between r0 and r1, and 4 samples in the region beyond r1. More generally other radially varying sampling functions may be used.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing machines. In addition, those of ordinary skill in the art will recognize that devices, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of stereoscopic rendering comprising:
receiving, by a stereoscopic display device, one or more first images;
displaying, by the stereoscopic display device, the first images to a first eye by rendering the first images; and
displaying, by the stereoscopic display device, one or more second images to the first eye or a second eye, wherein at least a portion of the second images is generated by using some or all of the first images by advection and any remaining portion of the second images is generated by rendering.

2. The method of claim 1, wherein generating the at least a portion of the second images by advection comprises advecting pixel values of the first images using a motion transform.

3. The method of claim 2, further comprising determining, by the stereoscopic display device, a minimum Z depth value corresponding to the first images, wherein the advecting pixel values of the first images is performed in response to the minimum Z depth value exceeding a threshold Z depth value.

4. The method of claim 1, wherein the first images comprise left eye images and the second images comprise right eye images.

5. The method of claim 1, wherein the rendering is based on a motion based sampling rate.

6. A stereoscopic display device comprising:
a first display that receives and displays a first image to a first eye of a user;
a GPU that generates a second image for display to a second eye of the user by reusing a portion of the first image and performing a motion based rendering to generate a remaining portion of the second image; and
a second display that receives and displays the second image.

7. The stereoscopic display device of claim 6, wherein the first image comprises a plurality of tiles, each of the tiles comprising a plurality of pixels, and some of the pixels in at least one of the tiles are reused to generate the second image.

8. The stereoscopic display device of claim 7, wherein reusing the portion of the first image comprises identifying locations of one or more of the pixels in the first image and reusing the one or more of the pixels in the second image using a motion transform.

9. The stereoscopic display device of claim 6, wherein the GPU is configured to determine a minimum Z depth value corresponding to the first image, and to reuse the portion of the first image in response to the minimum Z depth value exceeding a threshold Z depth value.

10. The stereoscopic display device of claim 6, wherein the first image comprises a left eye image and the second image comprises a right eye image.

11. The stereoscopic display device of claim 6, wherein the GPU is configured to render the remaining portion of the second image based on a motion based sampling rate.

12. A graphics processing system comprising:
a first memory that receives a first image; and
a GPU that generates a second image by reusing a portion of the first image and performing a motion based rendering to generate a remaining portion of the second image.

13. The graphics processing system of claim 12, wherein the first image comprises a plurality of tiles, each of the tiles comprising a plurality of pixels, and some of the pixels in at least one of the tiles are reused to generate the second image.

14. The graphics processing system of claim 13, wherein reusing the portion of the first image comprises identifying locations of one or more of the pixels in the first image and reusing the one or more of the pixels in the second image using a motion transform.

15. The graphics processing system of claim 12, wherein the GPU is configured to determine a minimum Z depth value corresponding to the first image, and to reuse the portion of the first image in response to the minimum Z depth value exceeding a threshold Z depth value.

16. The graphics processing system of claim 12, wherein the first image comprises a left eye image and the second image comprises a right eye image.

17. The graphics processing system of claim 12, wherein the GPU is configured to render the remaining portion of the second image based on a motion based sampling rate.

* * * * *